United States Patent [19]

Fingerle et al.

[11] Patent Number: 4,472,004
[45] Date of Patent: Sep. 18, 1984

[54] LUBRICATED BEARING FOR SPINNING ROTOR

[75] Inventors: Rudolf Fingerle, Esslingen; Günther Gutmann, Stuttgart; Theodor Hempel, Gerlingen, all of Fed. Rep. of Germany

[73] Assignee: SKF Kugellagerfabriken GmbH, Schweinfurt, Fed. Rep. of Germany

[21] Appl. No.: 237,601

[22] Filed: Feb. 24, 1981

Related U.S. Application Data

[63] Continuation-in-part of Ser. No. 180,099, Aug. 21, 1980, abandoned.

[30] Foreign Application Priority Data

Aug. 28, 1979 [DE] Fed. Rep. of Germany ....... 2934623
Jul. 19, 1980 [DE] Fed. Rep. of Germany ....... 3027492

[51] Int. Cl.$^3$ ............................................. F16C 33/66
[52] U.S. Cl. ...................................... 308/187; 384/286
[58] Field of Search ................. 308/20, 108, 116, 187, 308/240; 384/286, 289, 372, 379, 387, 392; 57/133, 134

[56] References Cited

U.S. PATENT DOCUMENTS 1,859,068  5/1932  Beach ................................... 308/187
2,017,290 10/1935  Parker ................................... 308/187
2,188,251  1/1940  Nelson ................................... 308/187
2,326,161  8/1943  Nelson ................................... 308/187
2,348,275  5/1944  Aker ................................. 308/240 X
3,424,273  1/1969  Carlson et al. ................. 308/187 X
3,730,599  5/1973  Fingerle ................................ 308/187

FOREIGN PATENT DOCUMENTS 1238997  4/1967  Fed. Rep. of Germany ...... 308/240

Primary Examiner—Stuart S. Levy
Assistant Examiner—Daniel P. Stodola
Attorney, Agent, or Firm—Murray Schaffer

[57] ABSTRACT

A bearing assembly for supporting the shaft of a spinning rotor is provided having a housing in which a pair of roller bearings are mounted spaced from each other along the shaft and which journal the shaft. Interposed between the roller bearings and surrounding the shaft is a sleeve in the form of a tubular member provided with at least one capillary channel formed between the inner and outer surfaces and extending longitudinally between its frontal ends. At least one hole extends from the outer surface radially inward in communication with the capillary channel. In this manner lubricant supplied to the housing exterior of the sleeve will pass through the hole and the capillary channel into direct contact with the roller bearings.

9 Claims, 10 Drawing Figures

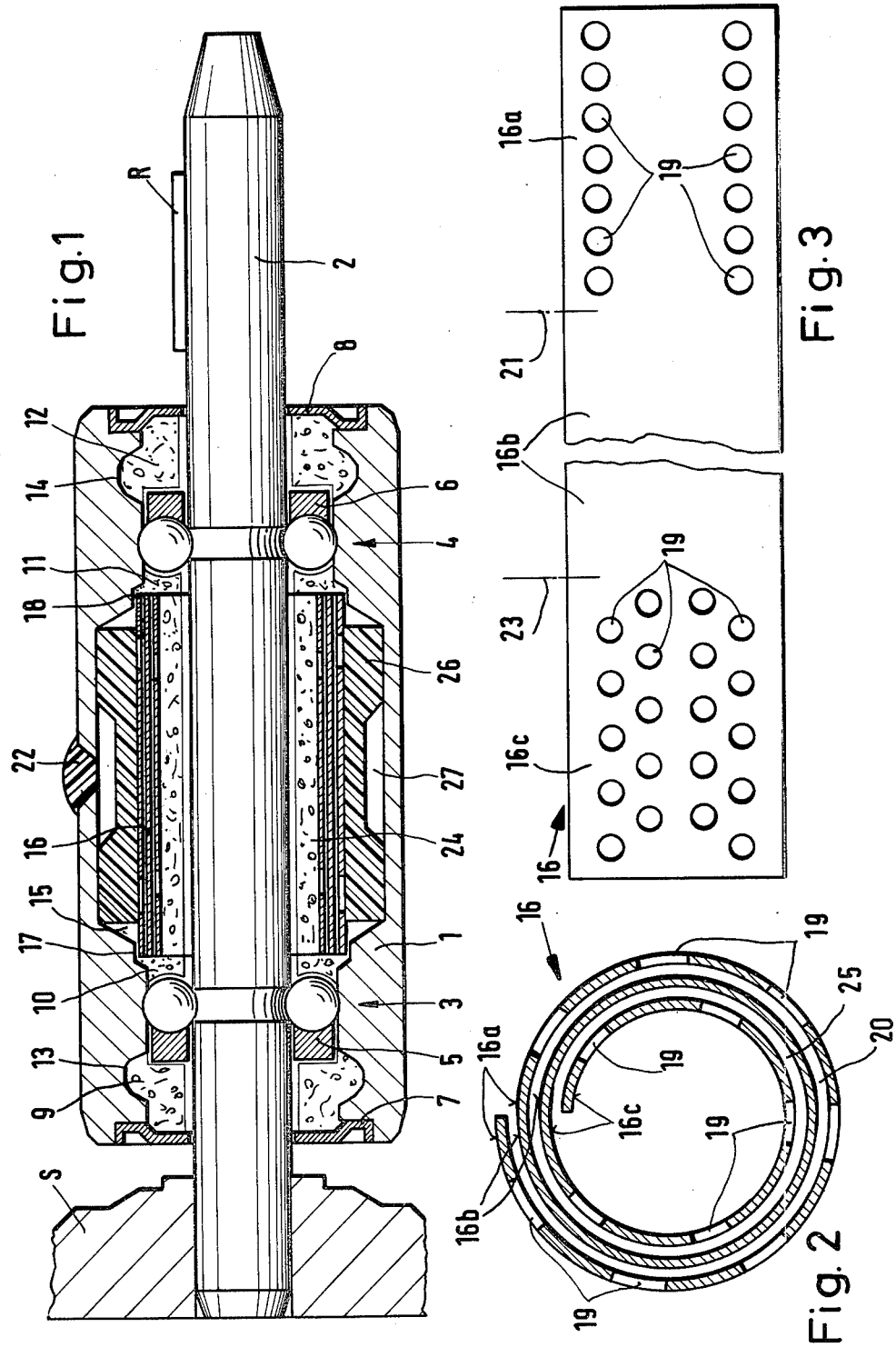

LUBRICATED BEARING FOR SPINNING ROTOR

BACKGROUND OF THE INVENTION

The present invention relates to a lubricated bearing assembly for the shaft of a yarn spinning rotor.

In German publication, DE-GM No. 69 38 370, a bearing assembly is shown in which the shaft carrying the rotor is held in two spaced grease-lubricated roller bearings within a housing which is provided with an opening for lubrication. A tubular sleeve for guiding a lubricant such as grease, surrounds the shaft between the roller bearings. Lubricant is supplied radially into the sleeve, which then feeds the lubricant through its frontal ends which face the roller bearings. The guide sleeve, which abuts flush on the inner wall of the housing, contains several continuous longitudinal grooves cut into its outer circumferential surface, so as to serve to hold a supply of grease, and at the same time to guide the grease to its two frontal ends. Attached to the frontal ends of the sleeve are metallic rings which are provided with openings aligned with the longitudinal grooves, the cross section of which are smaller than that of the longitudinal grooves. The metallic rings abut on the bearing races of the roller bearings and are heated during the rotation of the bearings by the heat generated in the bearings. As a result of this warming, the grease supply, located at both ends of the longitudinal grooves, melt and discharge from the openings in the rings onto the two roller bearings.

A quantity of grease contained in the central area of the longitudinal grooves, however, does not heat up or heats only to a very slight degree, and this central portion is not utilized for lubrication. Eventually, however, but in an aged condition, this central block of residual grease will be forced to the frontal ends of the longitudinal grooves by refilling the sleeve with additional lubricating grease. To this end, the housing is generally furnished with a nipple which leads into the central portion of the longitudinal grooves so that on introduction of new grease, displacement of the residue in the grooves is caused. The terminal areas of the longitudinal grooves will then contain a mixture of the aged lubricating grease, along with the solid substances of the grease still left there in the form of molten residue. When subsequently warmed during operation, this mixture will yield only a qualitatively poorer lubrication of the bearings.

The present invention has as an object the task of providing a lubrication system for a rotor bearing assembly, which rotor spins with a very high number of revolutions (80,000) and which system will guarantee optimal use of the lubricant supply which requires little maintenance.

A further object is to provide a system which does not result in reduced quality of the lubricant supply for the two roller bearings even during successive refilling of the lubricant reserve as might become necessary after an extended run. These and other objects as well as the advantages of the present invention will be apparent from the following disclosure.

SUMMARY OF THE INVENTION

According to the present invention a bearing assembly for supporting the shaft of a spinning rotor is provided having a housing in which a pair of roller bearings are mounted spaced from each other along the shaft and which journal the shaft. Interposed between the roller bearings and surrounding the shaft is a sleeve in the form of a tubular member provided with at least one capillary channel formed between the inner and outer surfaces and extending longitudinally between its frontal ends, and at least one hole extending from the outer surface radially inward in communication with the capillary channel. In this manner lubricant supplied to the housing exterior of the sleeve will pass through the hole and the capillary channel into direct contact with the roller bearings.

The roller bearings are formed adjacent the front ends of the housings and are packed with a suitable lubricant preferably a relatively heavy packing grease, the housing interior being contoured to hold a supply of such lubricant. Under normal operating conditions, the oil fraction in packing lubricant dissipates under the heat created by the rotation of the shaft and requires periodic replenishment.

As used herein, the capillary channel is to be taken as meaning a channel having a shape or cross section which causes liquid to move therein under its own force of attraction with the walls thereof creating a pressure or force independently of any applied pressure, gravity or the like.

Thus the lubricant passing through the holes and the capillary channels pass with appropriate and suitable force to the frontal ends of the tubular member and penetrate into the packing grease of the roller bearings and constantly replenish the same. On the other hand because of the capillary nature of the flow of the replenishing lubricant, an excess is present once the oil fraction of the packing grease is at equilibrium with the replenishment oil. Thus the packing grease is kept constantly at its proportionate oil saturation limit, guaranteeing always the greatest lubrication quality possible, without the danger of excessive lubrication.

The form of construction pursuant to the invention makes it possible to use not only grease but oil as a stored replenishment lubricant which, when replacement of the supply is necessary after an extended running period, can be refilled without any problem and without impairing the quality of the additional lubricant supply. The tubular member in which the arrangement of capillary channels is formed may itself be formed either from sections separated from or connected with each other. For instance, the capillary channel arrangement may be formed and distributed within the wall of a massive single or otherwise solid sleeve extending from the central area of the sleeve to each of its frontal ends, and may have either a slotlike, arcuate or a round cross section. The capillary arrangement, however, may be made by arranging several coaxial fluted or helically situated tubular members, or between the windings or turns of a strip of coiled material.

The creation of the capillary slots in this manner is simple and permits a lubricant supply to be stored in the housing adjacent the sleeve both at the outer surface facing the housing and its inner surface facing the shaft. Therefore a large quantity of replenishing lubricant may be stored in the housing. This enables also the possibility of having one of these supplies consisting of grease and the other of oil.

A further embodiment wherein a container for the replenishment supply is mounted within the housing is especially advantageous when oil is used. Such a container having controlled drainage enables both storage and slow draining of the oil into the sleeve, thus further eliminating the danger of over-lubrication of the roller bearings.

By particularly selecting the number and position of the holes in the tubular member a further advantage is obtained in that the flow of replenishment lubricant can be made optimally according to the respective type of lubricant used.

When the lubricant storage space between the outer surface of the tubular member or sleeve and the inner wall of the housing is filled with grease, there is the danger, when filling is performed through an inlet opening in the housing, and in particular with refilling required after long operation of the bearing, that a less than optimal filling of the storage space and grease distribution in it is attained. In addition, the possibility exists that during the delivery of grease, the grease will be under such pressure that portions of grease enter the starting point of the capillary channels and interfere at that point with the desired flow of the lubricant or, in passing through the channels reach the roller bearing directly, thus leading to excessive lubrication. This is overcome by providing an inlet and discharge opening for the lubricating separated by a substantially non-porous bridge, so that the grease is forced to disperse through the housing and excess grease discharged. Thus, filling of the storage space or replenishment can be carried out without the danger of overlubrication of the bearings.

The openings serving the feed and, respectively, discharge of the grease are preferably spaced from each other in the circumferential direction of the housing, and the longitudinal bridge between these openings, insures that the grease is ejected from the discharge opening only after traversing the circumference of the storage space, which additionally indicates that the storage space is completely full. If in addition the two openings are arranged axially spaced from each other, e.g., in the proximity of one or the other axial end of the grease storage space, movement of the grease is forced both in a circumferential and axial direction of the space prior to discharge, and therefore an optimal distribution is attained both in initial filling and in refilling, in which the greatest possible part of any residual grease from within the housing can be pressed out of the discharge opening by the newly added grease. This is particularly so when the discharge opening is larger than the inlet opening. The discharge opening requires a size sufficient only to produce a pressure in the grease which will permit full loading before discharge. The bridge may be modified to have tongues which define, in the housing, grooves for the controlled movement of the grease so that during filling any residual grease in the housing is moved and move evenly distributed.

A longitudinal bridge which serves the purpose of guiding the grease, as well as the tongues can be constructed as projecting parts of the inner wall of the housing or of the outer surface of the guide sleeve. It is deemed advantageous, however, if the inner wall and the outer jacket are designed to have a smooth cylindrical form, and the longitudinal bridge is designed as a distributing body capable of being removably inserted into the grease storage space.

Full details of the present invention are set forth in the following description and shown in the accompanying drawings:

BRIEF DESCRIPTION OF THE DRAWINGS

In the drawings:

FIG. 1 is a longitudinal view of a bearing and spinning rotor partially in cross section;

FIG. 2 is a cross sectional view somewhat enlarged of the wound guide sleeve shown in FIG. 1;

FIG. 3 is a plan view of the unwound guide sleeve shown in FIG. 2, in a somewhat smaller scale;

DESCRIPTION OF THE INVENTION

Figure 4:
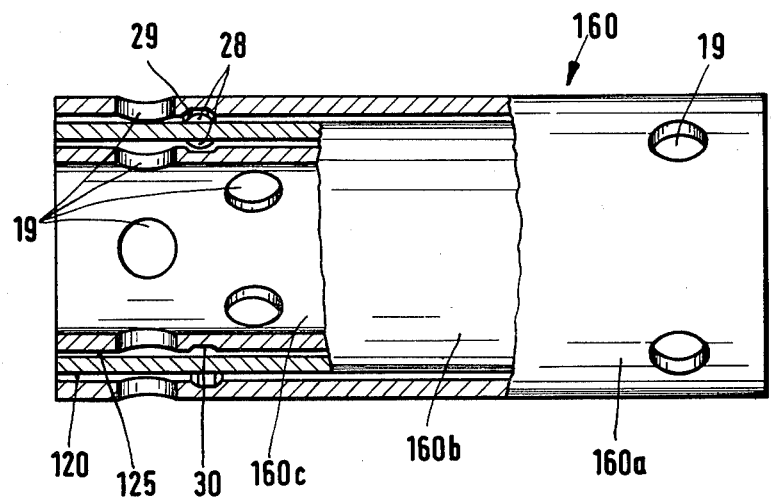
FIG. 4 is a longitudinal view, partially in section, of a guide sleeve of another embodiment of the present invention.

The bearing assembly shown in FIG. 1, comprises a housing 1 and a shaft 2 held in two rolling element bearings generally depicted by the numerals 3 and 4 respectively arranged at either end of the housing 1. The bearings 3 and 4 each comprise a plurality of balls retained in races forming in both the housing 1 and shaft 2. In lieu of the races being built directly into the shaft and into the housing as shown in the drawing, races could also be contained in suitable rings inserted and mounted into the housing and/or the shaft. The balls are held in cages 5 and 6 respectively. The frontal ends of the housing 1 are sealed off by gaskets 7 and 8 respectively. The forward end of shaft 2 protrudes through gasket 7, and is adapted to have a spinning rotor S of an open-ended spinning mechanism mounted thereon, whereas the opposite or rear end of the shaft 2 forms the peripheral working face for a tangential drive belt R.

As previously indicated, the spinning rotor is intended to operate at very high rotor speeds (up to about 80,000 RPM) and the lubricating system for the bearings as set forth in the following description, guarantees the supply of lubricant required for this purpose, for a long period.

According to the present invention, each of the ends of the housing is packed with a quantity of grease which lubricates the bearings 3 and 4. Similarly, a quantity of grease 9,10, which lubricate the bearings 3 and 4. Similarly, a quantity of grease 11, 12 is packed within the bearing on the other side of the balls. Such combined lubrication suffices for a limited period of operation. In order to accommodate as large a grease quantity as possible, the bearing housing 1 is provided with recesses 13 and 14 respectively between its frontal ends and the roller bearings, the former capable of accommodating proportionately large grease portions 9 and, respectively, 12.

The housing 1 is provided with a central annular recess in the area between the two roller bearings 3 and 4, by means of which a lubricant storage space 15 is created between the housing and the shaft. A tubular guide sleeve 16 encircles the shaft 2. The marginal edges of the inner wall of the housing are stepped, to form seats 17 and 18 on which the corresponding marginal edges of the sleeve 16 engage, so that it is limited against axial and radial movement relative to the shaft.

This guide sleeve 16, as can be seen especially in FIGS. 2 and 3, is formed from sheet material partially provided with perforations 19, which sheet is worked into a tight coil or roll forming in cross section a helical capillary slot 20 running the entire length of the sleeve. The sheet material is preferably metal but may, however, be also made of plastic material insert to the lubricant. The sheet material should be relatively inelastic but flexible so that when coiled it has a radial elasticity, which is present as a result of its rolling, so that it can be radially compressed and then inserted into the housing where it fixes itself into position under an initial stress with the marginal areas of its outer winding wall on both ends in the support sites 17 and 18. This initial stress is selected in such a way that the guide sleeve 16 is firmly positioned in the axial and raidal direction by the step-shaped design of the support sites 17 and 18. On the other hand, elasticity should be sufficiently strong to open the coil to maintain the capillary slots 20 longitudinally between the adjoining winding walls, permit flow of lubricant from one end to the other.

The housing 1 is provided with an inlet hole 22, which is normally plugged, for the introduction of lubricant into the space 15.

The guide sleeve 16 reaches with its frontal edges to the grease portions 10 and 11, respectively, and by resting on the support sites 17, 18 it separates the grease portions 10 and 11 from the lubricant storage space 15. The oil fractions leaking out from the grease portions 9, 11, and 12, during operation, lubricate the balls, as well as their running areas in the races and on the cages 5 and 6.

The lubricant storage space 15 may be filled with grease which should for practical reasons be of the type already supplied to the balls or compatible therewith. As seen in FIG. 3 the rectangular sheet forming the sleeve 16 is generally divided into three sections 16a, 16b and 16c. What eventually becomes the outer turns of the coil is defined between the right edge (as seen in the drawing) and the dot-dash line 21. The section 16a is provided with holes 19. The opposite end section 16c defined by the left edge (as seen in the drawings) and the dot-dash line 23 may or may not be formed with holes 19. The intermediate or transitional section 16b between the dot-dash lines 21 and 23 is free of holes.

In a basic form the sleeve 16 may be provided with perforations 19 only in the first section 16a which generally extends over its entire width (i.e., when coiled about its axial length) while the remaining sections 16b and 16c are unperforated. When coiled, the unperforated section is found on the interior of the coil, so that the perforated section forms the outermost winding, thus providing at least two full turns, between which is established a capillary slot. The oil fraction contained in the grease within the space 15 will eventually enter the capillary slot 20 existing between the outer and the adjoining winding wall through the perforations 19 in the outer winding of the sleeve 16 and will arrive, as a result of the capillary action present in the slot 20, at the frontal ends of the guide sleeve. This oil portion will then infiltrate the grease portions 10 and 11, replenishing the oil fraction escaping from the latter into the roller bearings and by its persistent flow until the grease contained in the space 15 is exhausted.

For the purpose of fully utilizing this grease in space 15, the holes in the outer winding wall 16a of the sleeve are in this case, unlike those shown in FIG. 3 on the right, arranged so as to be distributed over the entire axial length of the guide sleeve, as shown in FIG. 3 at left. The supply of grease in the lubricant storage space 15 is adequate to permit operation of the spinning rotor, fully lubricated for an extended period of time, without need for refilling.

For a still longer period of supply, the guide sleeve 16, as shown in FIGS. 2 and 3, can be wound in three complete coils. In this case, the inner section 16c facing the shaft 2 is also provided with holes 19 which, as shown in FIG. 3, are arranged so as to be distributed over the entire surface. The central section 16b remains unperforated. These arrangements make it possible to utilize the annular slot existing between the shaft 2 and the inner winding wall as an additional lubricant storage space and to store in it a grease supply 24 which also adjoins at both ends the grease portions 10 and 11. The oil fraction contained in the grease supply 24 enters a capillary slot 25 located between the inner end and the second or central winding wall by way of the holes 19, reaching through it, by capillary action, the frontal ends of the guide sleeve 16, and enter from there the grease portions 10 and 11, with the result of a final saturation of these grease portions 10 and 11, in the manner described above. The distribution of the puctures 19 over the entire surface of the inner winding wall 16c makes it possible to exhaust the oil fraction from the entire grease supply.

It may sometimes be of particular advantage if, as described initially, that a liquid lubricant, preferably oil, be introduced into the storage space 15 instead of the grease filling. This liquid lubricant should conform to and be compatible with the basic oil contained in the packing grease initially supplied to the roller bearings, and should at least match with respect to its degree of lubrication.

When oil is used, in place of grease, a container holding the oil and permitting its delivery to the guide sleeve 16 is inserted into the lubricant storage space 15. This container, as shown in FIG. 1, comprising a relatively thick walled hollow cylinder 26 constructed preferably of porous material, is mounted about the guide sleeve 16. An annular slot 27, is formed on the exterior surface of the cylinder 26 opposite the opening 22 in the housing. The oil supplied through the lubrication opening 22 enters the annular slot 27 from where it distributes itself evenly in the hollow cylinder 26. Quantities of oil still remaining in the annular slot 27 after the hollow cylinder 26 reaches saturation are retained in the remainder of the space 15, and subsequently absorbed into the hollow cylinder 26 in the same rate by which oil is utilized by the guide sleeve 16. For this purpose, the holes 19 are in this case, as shown in FIG. 3, arranged in the outer winding wall 16a in two parallel rows along the side edges of the sheet so that they are arranged when the sheet is coiled only in the area of the two axial ends of the hollow cylinder 26, i.e., in the area of greatest wall thickness of the cylinder 26 and thus of the largest oil storage. In the manner already described, the oil from the hollow cylinder 26, as a result of the capillary action present in the slot 20, reaches the packing grease 10 and 11. This oil after-flow of small volume, maintains the state of oil saturation in the packing grease. Despite the fact that the lubricant storage space 15 is completely filled with oil, no overlubrication of the roller bearings 3 and 4 occur because only that much of the oil which is held in the hollow cylinder 26 can penetrate into the packing grease masses 10 and 11 through the capillary slot which close off the sleeve at its front ends, as the oil is supplied in turn by consumption to the roller bearings 3 and 4.

Figure 5:
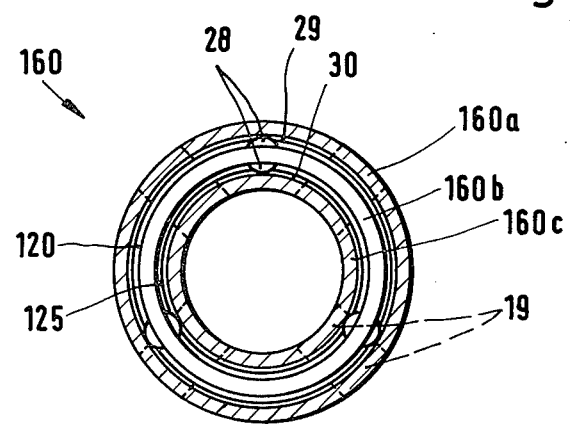
FIG. 5 is an end view of the guide sleeve according to FIG. 4.

In lieu of a guide sleeve which is wound of sheet material, the bearing such as shown in FIG. 1, can also be equipped with the guide sleeve such as shown in FIGS. 4 and 5. In FIGS. 4 and 5 the guide sleeve 160 is composed of three cylindrical shells 160a, 160b 160c coaxially telescoped into one another. The inner and outer diameters of the shells 160a, 160b and 160c are formed so that between each exists a ring-shaped capillary slot 120 and 125 respectively. To maintain axial position and radial distance of the shells from one another, a plurality of relatively high radial projections 28 are formed on the outer and/or inner surfaces of the shell 160b. Preferably the projections are provided, uniformly spaced in a band about the circumference of the shell 160b adjacent each of the ends of the shell 160b. Only one end is shown in FIG. 4. If this alone should not suffice to provide a friction-locking axial mounting of the shells one into the other, an annular slot 29 and 30 respectively can be provided additionally in the inner surface of the outer shell 160a and the outer surface of the inner shell 160c for the purpose of locking the projections 28 in place. The height of the projections 28 should be somewhat greater than the depth of grooves 29 and 30 to insure the proper capillary spacing between the shells. The shells 160a, 160b, 160c consist preferably of thin-walled metallic material, but they may also be plastic parts, which are radially flexible so that they can be inserted into one another and into their mountings in the seats 17 and 18 of the housing 1, Just as the coiled sleeve of FIG. 1. The shells 160a and 160c contain holes 19 communicating with the capillary slots 120 and 125 respectively, so that lubricant, both from a supply assigned radially on the outside of the shell 160a and a supply interior the inner wall of the shell 160c enter the slots 120 and 125 respectively, to reach the frontal ends through capillary action and penetrate from there into the packing grease masses 10 and 11 in the same manner already described. The shell 160b does not have any holes for the same reason that second 16b does not have any in the embodiment of FIG. 1. An analogous construction to a wound guide sleeve having only two windings, may be composed from the use of only two shells 160a and 160b.

In any event, the holes 19 in the shell 160a and 160c are arranged in a manner as already described for the arrangement of the holes 19 in the coil sections 16a and 16c (FIG. 3). The intermediate shell 160b is of course free of holes. When a hollow cylinder 26 is used in addition to the shell assembly 160, to store a liquid lubricant, the outer shell 160a contains, as shown, holes 19 only in the area of its two axial ends, whereas when the lubricant is grease, the holes 19 are distributed over its entire axial length of outer sleeve.

The bearing described can therefore be initially provided with an adequate lubricant supply for a long period of operation. Replenishment with a liquid and/or grease lubricant after a long period of operation is simple and for this purpose, the bearing can remain, if necessary, in its mount in the housing. The danger of soiling the roller bearings 3,4 and the capillary slots of the guide sleeves 16 and 160 is nonexistent, for the hollow cylinder container 26 which holds the oil, forms a filter preventing dirt particles from reaching the roller bearings. This replenishment of oil alone guarantees a constant final saturation of the packing grease measses 10 and 11 and of the marginal areas directly adjoining the packing grease supply 24, even if this grease supply 24 should already have become exhausted in its other areas after the long operating period by the complete utilization of its oil fraction. Conventional lubricant dispensors which adequately apportion quantities can be used for the initial filling and refilling of the lubricant storage space 15 with oil, and/or grease. The flow of the lubricant to the frontal ends of the sleeve 16 and 160, respectively, occurring during the capillary action of slots 20, 25 and 120,425 respectively, is enhanced, in addition if required, by the pump action resulting when the sleeve is subjected to vibration during the rotation of the shaft.

Figure 6:
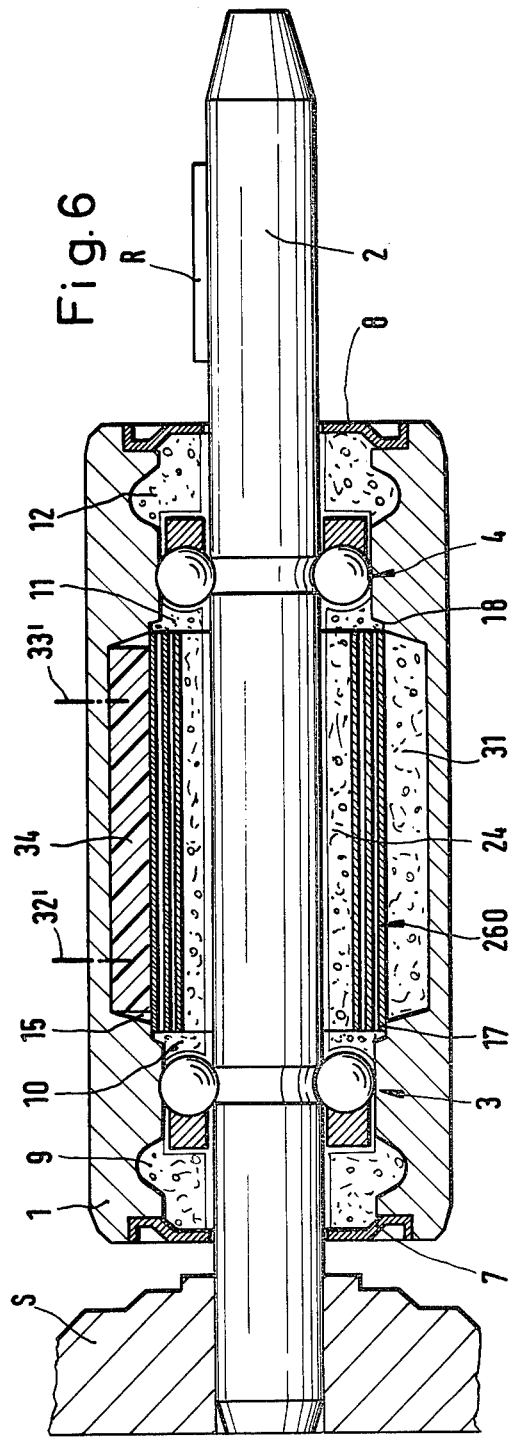
FIG. 6 is a view similar to that of FIG. 1 showing another type of lubricant storage and guide sleeve.
Figure 8:
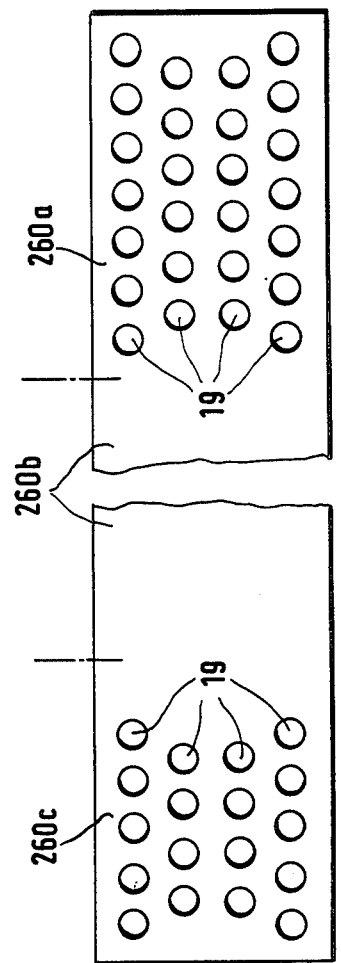
FIG. 8 is a plan view of the unwound guide sleeve shown in FIG. 7, in a different scale.
Figure 7:
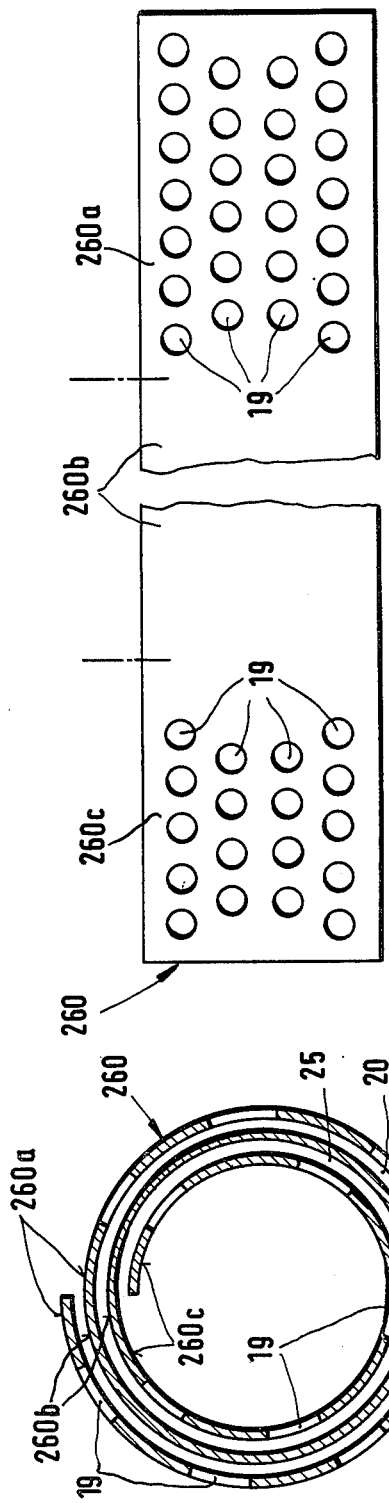
FIG. 7 is an enlarged cross section of the guide sleeve, seen in FIG. 6.

The assembly of the spinning rotor represented in FIG. 6 corresponds in its basic construction to the assembly shown in FIG. 1. In conformity with the latter, the same reference numerals define identical parts. In this embodiment the guide sleeve 260 surrounds the shaft 2 and is also wound in narrow coils of sheet material (see in particular FIG. 7) and is emplaced firmly under initial tension in the support sites 17, 18 by utilizing its radial elasticity. This guide sleeve 260 differs from the guide sleeve shown in FIGS. 1 to 3 only in that it has holes 19 distributed fully over the section 260a forming its outer turn and also over the section 260c forming its inner turn. The section 260b in the center is free of holes. The turns forming capillary slots 20 and 25, which run from one frontal end of the sleeve 260 to the other frontal end are shown in FIG. 7 exaggerated in size for the sake of clarity.

The packing grease masses 9 to 12 are put into place during the assembly of the bearing and the oil portion discharged from the former lubricates the bearings 3 and 4. Furthermore, the annular space between the shaft 2 and the former section of the sleeve 260 is filled also with the grease supply 24, whereby the oil portion of the latter which is close to the bearings 3 and 4, reaches the latter directly, while the remaining oil portion enters the capillary slot 25 between the inner turn 260c and the center turn 260b through holes 19 of the inner turn 260c flowing thereupon to the frontal ends from the sleeve 260 to the bearings 3 and 4.

Figure 9:
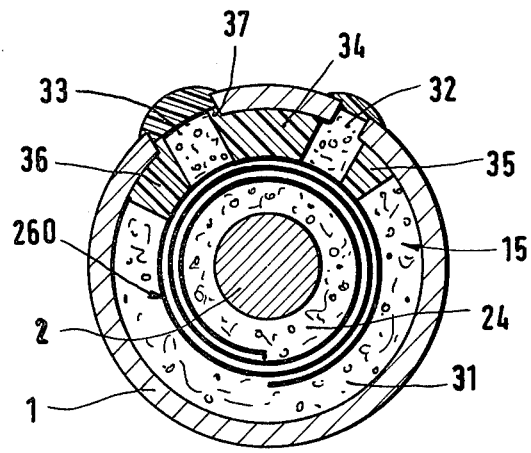
FIG. 9 is a cross-sectional view along line IX—IX of FIG. 6.

As seen in FIG. 9, for the purpose of supplying packing grease 31, the bearing-housing 1 contains, in addition to a grease inlet opening 32, also a grease discharge opening 33 spaced therefrom a short distance radially in circumferential direction, and a short distance axially, in the longitudinal direction. The diameter of the discharge opening 33 is greater than that of the grease feed opening. Detachable sealing caps are provided for both openings. The dashdot lines 32' and 33' in FIG. 6 denote the position of these two openings with reference to dog-legged distance from one another in the axial direction. These dash-dot lines show that the openings 32 and 33 lead into the storage space 15 at the respective ends.

Figure 10:
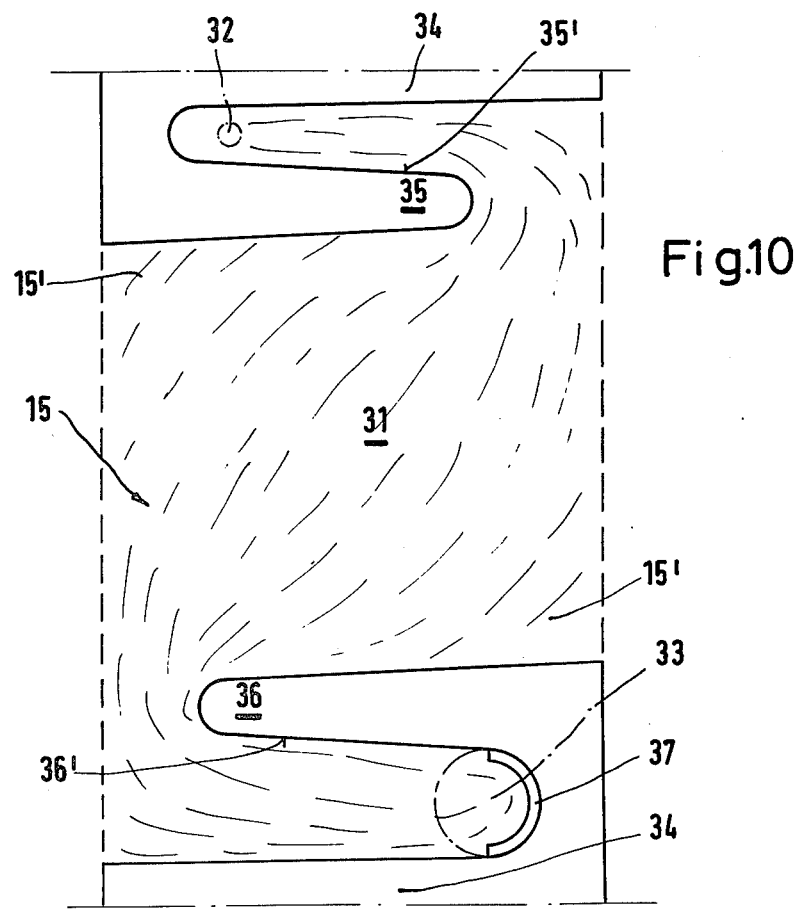
FIG. 10 is a view showing the guide sleeve of FIG. 9, in development.

A substantially non-porous bridge 34 is located in the cross-sectional sector between the two openings 32 and 33. The bridge 34 extends in the axial direction within the storage space 15 creating a baffle so that lubricant fed into the feed inlet 32 has to travel along the remaining circumference of the storage space 15 prior to its being able to egress again through the discharge opening 33. As a result of the distance between the two openings 32 and 33, in the axial direction, an axial travel of the lubricant is required simultaneously within the storage space 15, distributing the lubricant over the entire storage space 15. The migration of lubricant to its exit from the opening 33 can be improved by forming depending tongues 35 and 36 on the bridge 34 near each of the respective ends but interior of the inlet and discharge openings. As can be noted in FIG. 10, the tongues 35 and 36 are developed from opposite side edges of the storage space so as to project towards each other and are arranged in such a way that the openings 32 and 33 respectively are located in a cut out passage between the tongues and the frontal edges of the bridge 34. By means of its guiding edge 35' the tongue 35 effects first, between itself and the longitudinal bridge 34, the migration of the lubricant supplied in the axial direction of the space 15 and from the latter subsequently across the circumferential space to the other side edge, from where the lubricant, after having filled the space 15 completely, is finally guided into the space between the guiding edge 36' of the tongue 36 and the frontal end to bridge 34 to its egress from the opening 33. This kind of lubricant migration is especially advantageous for replenishing the storage space 15 with a grease lubricant because the greatest possible volume of used lubricant can be pushed thereby towards the grease discharge opening 33 by the newly added lubricant and be forced out of the latter. Old grease residue may then remain at best only in the corner areas 15'.

The bridge 34 is preferably, as shown, a separable part which can be removably inserted into the grease storage space 15. With or without the additional application of the tongues 35 and 36, the latter can, as is also illustrated in the drawing, be axially inserted into the storage space 15. Preferably the bridge 34 has a length equal to the length of the storage space 15 so that it is fixed firmly in position in this direction. To secure the bridge 15 against rotation in the circumferential direction collar-like projection 37 may be mounted on its outer wall which enters into the discharge opening 33. The kind of lubricant distribution system afforded by means of the bridge 34 and the tongues 35 and 36, may of course be carried out also in conjunction with the guide sleeve illustrated in FIGS. 4 and 5.

Various modifications, changes, and embodiments have been shown and described. Other such variations will be apparent to those skilled in this art. Accordingly, the present disclosure is intended to be illustrative only and not limiting of the prior art.

What is claimed is:

1. A bearing assembly for supporting the shaft of a spinning rotor and storing lubricant comprising a housing, a pair of spaced rolling element bearings mounted in said housing and rotatably journalling said shaft, an opening in said housing for introduction of lubricant, a tubular member formed of sheet metal wound into a coil, providing an inner turn having a surface opposed to said shaft and defining therewith an inner chamber and an outer turn having a surface opposed to said housing and defining therewith an outer chamber, at least one of said chambers being adapted to store lubricant, said tubular member extending between said bearings for guiding said lubricant into proximity with the bearings, at least said inner and outer turns having holes therein in communication with said respective chambers and at least one turn in the center of said coil unperforated to define an open capillary channel extending longitudinally of said tubular member between its frontal ends and said holes extending through said tubular member from said at least one of the inner and outer chambers radially inward in communication with said capillary channels.

2. The assembly according to claim 1, wherein said housing is provided with a contoured interior for receiving said tubular member, said contour having a land portion at each end adapted to receive and support said tubular member at least against axial movement.

3. The assembly according to claim 1, including a container holding liquid lubricant, said container being interposed within said housing between the outer surface of said tubular member and the circumferential inner wall of said housing.

4. The assembly according to claim 3, wherein said container comprises a hollow cylinder having an annular slot aligned axially with the opening in the housing for introduction of lubricant.

5. The assembly according to claim 1, wherein said housing includes a lubricant discharge opening, spaced from the lubricant inlet opening in the circumferential direction of said housing, and includes a bridge member, inserted in said housing to occlude the sector between said inlet and outlet opening from passage of lubricant.

6. The assembly according to claim 5, wherein said bridge member is provided with radially depending tongues forming a contoured passage in the surface thereof facing said tubular member to enhance the flow of lubricant between said bridge and tubular member.

7. The assembly according to claim 6, wherein said tongues extend respectively from opposite sides of said bridge member spaced from the axial ends thereof to provide groove passages therebetween, one of said passages being provided with a hole in registry with the inlet in said housing, the other passage being provided with a hole in registry with the outlet from said housing.

8. The assembly according to claim 5, wherein said bridge member is removably insertable within said housing.

9. The assembly according to claim 8 including means for fixing said bridge member in registry with said inlet and outlet openings.

* * * * *